United States Patent Office 3,419,655
Patented Dec. 31, 1968

3,419,655
TREATMENT OF INFLAMMATIONS BY ADMINISTERING A CYCLOLEUCYL COMPOUND
Harvey E. Alburn, West Chester, and Norman H. Grant, Wynnewood, Pa., assignors to American Home Products Corporation, New York, N.Y., a corporation of Delaware
No Drawing. Filed Mar. 17, 1967, Ser. No. 623,839
5 Claims. (Cl. 424—305)

ABSTRACT OF THE DISCLOSURE

A process for treating inflammations in warm-blooded animals by administering a compound selected from a group of cycloleucyl compounds; e.g., 1-aminocyclopentanecarboxylic acid, 1-methylaminocyclopentanecarboxylic acid, and 1-aminocyclopentanecarboxylic acid, ethyl ester.

SUMMARY OF THE INVENTION

This invention relates generally to a method of treating inflammations in warm-blooded animals. More particularly, the invention relates to such a method which utilizes the administration to warm-blooded animals of a compound selected from a group of compounds defined hereinafter, which compounds we have found to have unexpected anti-inflammatory activity.

DESCRIPTION OF THE INVENTION

We have now discovered that a particular group of compounds, previously known only to be useful primarily as chemical intermediates, surprisingly are highly effective anti-inflammatory agents. Thus, our invention, in its broadest concept, resides in the method of treating an inflammation in a warm-blooded animal by administering to said animal in which said inflammation is undesirable, a therapeutically active amount of a compound selected from the group consisting of those having the following general formula:

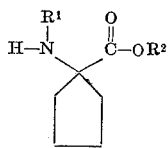

wherein $R^1$ and $R^2$ are each of the group consisting of hydrogen and lower alkyl.

Specific compounds falling within Formula I as defined above and, hence, useful in the method of invention are, for example, 1-aminocyclopentanecarboxylic acid per se, 1-methylaminocyclopentanecarboxylic acid, and 1-aminocyclopentanecarboxylic acid, ethyl ester. The first compound may also be used in the form of its polymers having a repeating molecular unit, which may be present in a frequency as high as 100, for example; whereas the last compound may also be used in the form of its acid-addition salts; e.g., as the HCl salt thereof.

The acid forms of the compounds falling within Formula I above, wherein $R^2$ is hydrogen, may generally be prepared by known procedures. For example, the corresponding hydantoin of the unsubstituted amino acid (i.e., wherein both $R^1$ and $R^2$ are hydrogen) may first be synthesized by heat-reacting cyclopentanone with potassium cyanide in the presence of ammonium carbonate in an aqueous ethanol reaction medium until the ethanol and ammonium carbonate are removed. The cooled residual solution may then be brought to pH 3 as by addition of mineral acid, after which the precipitated hydantoin may be filtered off, washed and dried. The resulting hydantoin may then be refluxed under nitrogen with concentrated sulfuric acid. The resulting solution may then be cooled and neutralized to pH 5, as by addition of sodium hydroxide. The resulting product may then be purified by conventional means such as dissolving in warm water, treating with activated charcoal, raising the pH, and cooling to obtain a solid product which may then be dried.

The lower alkyl N-substituted amino acids coming within Formula I (i.e., wherein $R^1$ is lower alkyl and $R^2$ is hydrogen) may be prepared by heating the corresponding N-alkylated-p-toluenesulfonamido acid with concentrated hydrochloric acid in a bomb, and then recovering the resultant lower-alkyl-substituted acid by the usual purification and isolation techniques.

The lower alkyl esters of the compounds defined in Formula I (i.e., wherein $R^1$ is either hydrogen or lower alkyl and $R^2$ is lower alkyl) may be prepared from the corresponding acid, obtained in the manner previously described, by refluxing said acid in a mineral-acid-saturated alcohol medium, and thereafter adding benzene, forming a ternary azeotrope which is then distilled. The lower alkyl ester may then be evaporated to dryness, and the residue crystallized from ethanol and ether.

An inflammation is an abnormal condition of the tissues of some part of the body in which there is swelling, redness, heat and pain. It involves the process by which the body attempts to rid itself of bacteria, poisons, or other foreign substances which irritate or injure the tissues. The blood vessels in the affected part expand, causing more blood to flow into the irritated or injured area. The increased amount of blood in the affected part causes the redness, and the expanded blood vessels cause swelling. The accumulation of blood cells and expanded blood vessels press on sensory nerves to cause the pain that may accompany an inflammation. In those instances where the presence of bacteria is involved, white blood corpuscles pass through the blood vessels into the injured or invaded area to destroy many bacteria in situ. (The accumulation of bacteria and white corpuscles occurring in an inflammation is the matter termed "pus.")

It is well known that agents which are effective against inflammations are active also in preventing histopathologic changes which occur in experimentally induced granuloma in test animals. Such agents include the compounds prednisolone and phenylbutazone, each of which has been shown to be active against inflammations. Thus, experimentally induced inflammations in test animals may serve as a test standard for anti-inflammatory activity in general.

The experimentally induced inflammation found to be valuable for comparing the anti-inflammatory activity of a compound to be tested, with that of the aforesaid standard compound, may be caused by the insertion of cotton pellets into bilaterally adrenalectomized test animals in accordance with the procedure described by C. A. Winter et al. in Federation Proceedings, March-April 1963, vol. 22, No. 2, Part I.

Test method

Pursuant to the test procedure of C. A. Winter et al. referred to above, male Wistar rats, weighing 150± grams are bilaterally adrenalectomized. The adrenalectomized rats are anesthetized and two cotton pellets are inserted subcutaneously in each animal. The cotton pellets are preferably Johnson and Johnson dental rolls (1), having weight ranges of 38±1; 40±1; 41±1; 42±1; 43±1; and 44±1 mg. The animals are then provided with 1% saline solution containing 0.01% glucose, and a standard stock diet, and the room temperature maintained at 78°–80° F. Beginning on the same day of the insertion of the cotton pellets, treatment is instituted by oral administration of 1.5 and 3.0 mg. of selected test compounds in aqueous solution of carboxymethyl cellulose (0.5%) with respect to half the rats. The treatment is administered twice daily for five consecutive days for a total of ten doses.

All of the rats (both those treated and the control group) are autopsied on the seventh day and the granulomas (cotton pellets) are removed. The pellets are dried for 72 hours at 80° C. and then maintained for 24 hours at room temperature. The pellets are then weighed individually to the nearest 0.1 mg.

The anti-inflammatory activity of the test compounds may then be expressed as percent inhibition, which is determined with the use of the following formula:

Percent inhibition =

$$100 \times \frac{\text{Av. pellet wt. increase for control minus av. pellet wt. increase for treated}}{\text{Av. pellet wt. increase for control}}$$

The statistical significance and percent relative potency of the test compound is then compared with that of the reference standard used.

In the exercising of the method of the invention, the compounds of Formula I used therein may be administered alone or in combination with pharmaceutically acceptable carriers, and the proportion of which is determined by the solubility and chemical nature of the compound selected, the chosen route of administration, and standard pharmaceutical practice. For example, they may be administered orally in the form of tablets or capsules, which may contain conventional excipients, or in the form of solutions; or they may be injected parenterally, that is, intramuscularly, intravenously or subcutaneously. For parenteral administration, they may be used in the form of sterile solutions containing other solutes, for example, enough saline or glucose to make the solutions isotonic.

The dosage of the present therapeutic agents will vary with the form of administration and the particular compound chosen. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 10 mg. to about 160 mg. per kg. of body weight per day, although as aforementioned, variations will occur. However, a dosage level that is in the range of from about 10 mg. to about 80 mg. per kg. of body weight per day is most desirably employed in order to achieve effective results.

The surprising efficacy of the compounds of Formula I above in the treatment of inflammations in accordance with the foregoing test procedure has clearly indicated that they are extremely active, relatively nontoxic, long-acting anti-inflammatory agents.

The following examples are illustrative of the preparation of the compounds useful in the method of the invention and of the exercising of the latter, but are not to be considered necessarily limitative thereof:

EXAMPLE I.—THE USE OF 1-AMINOCYCLOPENTANE-CARBOXYLIC ACID IN TREATING INFLAMMATIONS (A1) To 154 grams of cyclopentanone are added 342 grams of ammonium carbonate monohydrate and 1 liter of 60% v./v. aqueous ethanol. The suspension is heated to 55° C. and 100 grams of potassium cyanide dissolved in 250 ml. of water are added over a period of 1 hour. The mixture is held at 55°–60° for 2 hours and then heated to 90° until the ethanol and ammonium carbonate are removed. The solution is cooled, 100 ml. of water added, and the solution is brought to pH 3 with hydrochloric acid, using adequate ventilation. The precipitated hydantoin is filtered off, washed with water and dried at 100° C. Yield: 90%, M.P. 216°–217°.

(A2) One mole (154 grams) of the hydantoin obtained in (A1) above is refluxed for 72 hours under nitrogen with 450 grams of 60% w./w. sulfuric acid. The solution is cooled and neutralized to pH 5 with solid sodium hydroxide. The mixture is cooled to 0°, filtered, and the solid washed with cold water. The solid is dissolved to 2 liters of warm water at pH 2, treated with activated charcoal, adjusted to pH 5, cooled to 0°, and the product is then filtered off, washed with cold water, and finally dried. Yield: 56%.

Calculated for $C_6H_{11}O_2H$: C, 55.77; H, 8.59; N, 10.84. Found: C, 55.64; H, 8.49; N, 10.52.

(B) Following the procedure set forth hereinbefore under the heading "Test method," the compound obtained in (A2) of this example was compared with butazolidin to obtain the results in Tables 1 and 2 below:

TABLE 1.—ANTI-INFLAMMATORY ACTIVITY OF 1-AMINOCYCLOPENTANECARBOXYLIC ACID GRANULOMA INHIBITION TEST (SUBCUTANEOUS ADMINISTRATION)

Relative potency: 1.928.
Initial pellet weight: Mean, 43.0; S.D., 1.0.

| Agent | Total Dose | Pellet Weight (mg.) Mean | Pellet Weight (mg.) S.D.[2] | Pct. Inhib. | Act | Thymus, Wt. Ch.[1] (pct.) | Animal, Wt. Ch.[1] Mean | Animal, Wt. Ch.[1] S.D.[2] | P[3] | Regr.[4] |
|---|---|---|---|---|---|---|---|---|---|---|
| Control | 5.00 | 50.02 | 6.44 | .74 | .00 | 9.0 | +34.2 | 16.9 | .00 | .00 |
| Butazolidin[5] | 15.00 | 42.36 | 10.45 | 15.96 | .05 | 8.9 | +46.8 | 14.4 | .00 | |
|  | 30.00 | 34.93 | 5.19 | 30.70 | .05 | .2 | +40.8 | 8.5 | .00 | .00 |
| 1-aminocyclopentanecarboxylic acid | 7.50 | 42.05 | 4.67 | 16.57 | .05 | 9.8 | +29.6 | 15.3 | .00 | |
|  | 15.00 | 39.60 | 8.72 | 21.43 | .05 | 21.8 | +37.5 | 5.5 | .00 | |
|  | 30.00 | 37.04 | 4.19 | 26.51 | .05 | 8.1 | +2.8 | 16.5 | .05 | |
|  | 60.00 | 29.56 | 3.26 | 41.35 | .05 | 54.0 | −33.5 | 4.4 | .05 | .05 |

[1] Wt. Ch. = Weight change.
[2] S.D. = Standard deviation.
[3] P. = Probability that result is due to chance.
[4] Regr. = Regression.
[5] Butazolidin = Phenylbutazone.

TABLE 2.—ANTI-INFLAMMATORY ACTIVITY OF 1-AMINOCYCLOPENTANECARBOXYLIC ACID GRANULOMA INHIBITION TEST (ORAL ADMINISTRATION)

Relative potency: 1.303.
Initial pellet weight: Mean, 43.0; S.D., 1.0.

| Agent | Total Dose | Pellet Weight (mg.) Mean | Pellet Weight (mg.) S.D.[2] | Pct. Inhib. | Act | Thymus, Wt. Ch.[1] (pct.) | Animal, Wt. Ch.[1] Mean | Animal, Wt. Ch.[1] S.D.[2] | P[3] | Regr.[4] |
|---|---|---|---|---|---|---|---|---|---|---|
| Control | 10.00 | 50.40 | 9.19 | .00 | .00 | .0 | +45.2 | 19.5 | | |
| Butazolidin[5] | 15.00 | 41.38 | 7.73 | 17.90 | .05 | 3.8 | +26.4 | 6.0 | .00 | |
|  | 30.00 | 38.86 | 4.32 | 22.89 | .05 | 8.7 | +30.5 | 8.3 | .00 | .00 |
| 1-aminocyclopentanecarboxylic acid | 7.50 | 51.10 | 6.12 | −1.37 | .00 | 20.8 | +24.0 | 8.0 | .05 | |
|  | 15.00 | 44.88 | 10.46 | 10.96 | .00 | 10.1 | +33.6 | 18.5 | .00 | |
|  | 30.00 | 35.69 | 5.97 | 29.19 | .05 | 26.6 | +7.2 | 21.6 | .05 | |
|  | 60.00 | 27.33 | 7.24 | 45.77 | .05 | 44.0 | −25.3 | 5.7 | .05 | .05 |

For footnotes see end of Table 1.

The results in Tables 1 and 2 above indicate that 1-aminocyclopentanecarboxylic acid is an extremely active agent for depressing the symptoms of inflammation. No toxicity, either acute or chronic, was observed at the dosages employed.

EXAMPLE II.—PREPARATION AND USE OF 1-METHYL-AMINOCYCLOPENTANECARBOXYLIC ACID (A1) (N - methyl-p-toluenesulfonamido)cyclopentanecarboxylic acid 55.8 g. (0.188 mole) and 600 ml. of conc. HCl were heated to 140° C. in glass bomb tubes for 20 hours. After cooling, the solution was evaporated to dryness on a rotary evaporator, the residue was dissolved in 50 ml. of water, passed through a column of IR 4B resin (0.525 equivalent in the hydroxyl cycle) and the effluent was lyophilized. The solid residue was washed with 500 ml. of absolute ethanol and dried. Yield: 18.4 g. 69% $N_{sought}$ 9.8%. $N_{found}$ 9.49%.

(B) On oral administration of the compound obtained in A. of this example to rats at a total dose of 15 mg. in the granuloma inhibition test referred to in Example I(B), 20.92% inhibition was observed.

EXAMPLE III.—PREPARATION AND USE OF 1-AMINOCYCLOPENTANECARBOXYLIC ACID, ETHYL ESTER, HYDROCHLORIDE (A) 1-aminocyclopentanecarboxylic acid 50 g. (0.39 mole), obtained as in Example I(A), was refluxed in 2,000 ml. of HCl-saturated ethanol for 2 hours. Benzene, 600 ml., was added and 1,000 ml. of ternary azeotrope was removed by distillation. The reaction mixture was evaporated to dryness and the residue crystallized from ethanol and ether.

| | | |
|---|---|---|
| Yield | g | 56 |
| M.P. | °C | 224–226 |
| $N_{sought}$ | percent | 7.23 |
| $N_{found}$ | do | 7.67 |

(B) Again, using the test procedure referred to in Example I(B), the compound of (A) of this example at total oral doses of 15 and 30 mg. showed inhibitions of 17.53 and 34.63%, respectively.

We claim:
1. A method of treating an inflammation in a warm-blooded animal, which method comprises: administering to said animal an anti-inflammatory active amount of a compound having the following formula:

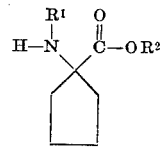

wherein $R^1$ and $R^2$ are each of the group consisting of hydrogen and lower alkyl.

2. A method as defined in claim 1 wherein the amount of said compound administered comprises from 10 mg./kg. to 80 mg./kg. of said animal treated, on a per day basis.

3. A method as defined in claim 1 wherein said compound is 1-aminocyclopentanecarboxylic acid.

4. A method as defined in claim 1 wherein said compound is 1-methylaminocyclopentanecarboxylic acid.

5. A method as defined in claim 1 wherein said compound is 1-aminocyclopentanecarboxylic acid, ethyl ester, hydrochloride.

References Cited

Chem. Abst., 55, p. 5770G (1961).
Chem. Abst., 57, p. 1570 C (1962).

ALBERT T. MEYERS, *Primary Examiner.*

R. FRIEDMAN, *Assistant Examiner.*

U.S. Cl. X.R.

424—319